Patented Jan. 2, 1923.

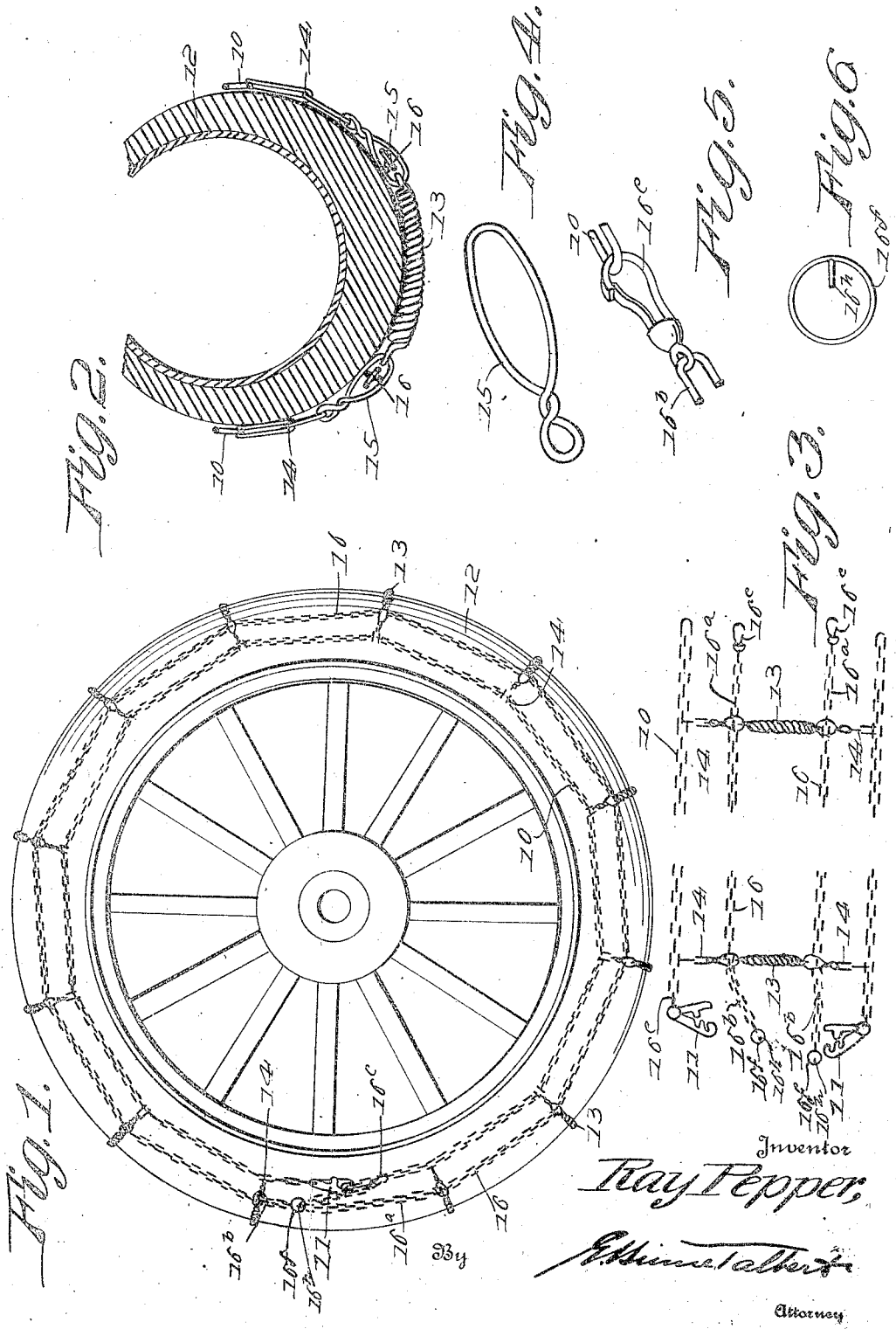

1,441,113

UNITED STATES PATENT OFFICE.

RAY PEPPER, OF FAIRMONT, WEST VIRGINIA.

AUTOMOBILE TIRE CHAIN.

Application filed January 3, 1922. Serial No. 526,683.

*To all whom it may concern:*

Be it known that RAY PEPPER, a citizen of the United States of America, residing at Fairmount in the county of Marion and State at West Virginia, has invented new and useful Improvements in Automobile Tire Chains, of which the following is a specification.

The object of the invention is to provide in connection with a tire chain of generically conventional type a readily applicable means for guiding against side skidding of the wheel to which it is applied without in any way detracting from the efficiency of the elements designed to prevent forward and rearward slipping or skidding but on the other hand designed to increase the efficiency of the tread elements as ordinarily used; and furthermore to provide a device of this type which may readily be repaired or of which worn or broken parts may be readily replaced to prolong the efficiency thereof at a moderate expense; and with these objects in view the invention consists in a construction and combination of parts of which a preferred embodiment is shown in the accompanying drawings, wherein:—

Figure 1 is a side view of a tire chain embodying the invention applied in the operative position to a wheel.

Figure 2 is a cross sectional view of the same.

Figure 3 is a plan view partly broken away of a chain arranged in a flat condition and showing both terminals.

Figures 4 and 5 are detail views respectively of one of the running eyes and the terminal fastener for the supplemental anti-skid element.

Figure 6 is a plan view of the terminal eye carried at one end of each of the supplemental anti-skid elements.

The chain embodies essentially the parallel side members 10 which serve as retainers and which are provided with terminal shackles or similar fastening devices indicated at 11 for connecting their terminals at opposite sides of the tire 12 when the device is applied to the wheel, and which side members are preferably of the linked or chain form indicated and conventionally employed in this connection, and transverse tread members 13 consisting in the present instance of intertwisted strands of heavy wire or rods of a sufficient flexibility to conform to the curvature transversely of the tire tread as shown in Figure 2, and the terminals of which tread members are connected with the side members 10 by means of tie members 14 which are also preferably of linked or chain construction and which lie in contact with the side surfaces of the tire between the side members and the tread members and serve to hold the latter in proper position against displacement longitudinally of the tire tread.

The tie members 14 are connected with the extremities of the tread members 13 by means of relatively enlarged running eyes 15 arranged at a uniform distance from the side members 10 and in a series parallel therewith, and movably threaded through these running eyes parallel respectively with the side members 10 are supplemental longitudinal tread members 16 also of linked or chain construction. The extremities 16ᵃ and 16ᵇ of the supplemental longitudinal tread members are terminally provided respectively with the fasteners 16ᶜ and the eyes 16ᶠ, the latter being formed with radial inwardly projecting prongs 16ʰ. After the attachment of the extremities of the side members 10 by means of the fasteners 11, the supplemental tread members are connected by passing the fasteners 16ᶜ through the eyes 16ᶠ, the latter providing a running engagement for the portions 16ᵃ of the side members until the proper tension on the latter is secured, when selected links in the side members are engaged with the prongs 16ʰ to maintain the tension. The fasteners 16ᶜ are then connected into one of the links of the main side members 10. It is thus seen that the arrangement not only provides for securing the desired tension of the supplemental tread members but also provides for placing the main side members under tension by the connection therewith of the free extremities of the supplemental members.

The location of the running eyes with relation to the side or retaining members 10 of the device positions the supplemental longitudinal tread elements 16 at opposite sides of and parallel with the tread portion of the tire as will be obvious by reference to Figure 2 so that as the wheel equipped with the device progresses, the said members 16 occupy positions substantially in the plane of and at opposite sides of that portion of the tire tread which is depressed by the weight of the car. In other words the side members 16 lie normally substantially in the plane of that portion of the tread which is carrying the weight of the car and which is slightly flattened by contact with the road surface under the stress of the weight superposed thereon, but said longitudinal tread members do not come between the bearing portion of the tire tread and the road bed or surface and therefore are not subjected to the direct pressure of the wheels in the ordinary operation thereof. But should the wheel tend to move transversely or skid laterally the relation of the longitudinal tread member to the tread of the wheel, on that side toward which the wheel tends to skid or move, will cause the adjacent portion of the longitudinal tread member to roll under the tread of the wheel or loop laterally and inwardly between the adjacent points of connection with the transverse tread members or the stay members, and thus serve as an anti-skid element to check such lateral or transverse movement of the wheel.

In other words whereas the supplemental longitudinal tread elements ordinarily occupy positions adjacent to and parallel with the operative tread portion of the wheel and in the forward progress of the wheel are practically inoperative, any tendency of the wheel to slide or skid laterally will bring one or the other of the said tread elements into action to check said lateral movement and direct the wheel in its proper forward progress.

This action of the supplemental tread elements is due largely to the location thereof at opposite sides of and close to the normal tread surface of the tire and to the fact that there is a loose running connection between said tread elements and the transverse stay members, so as to afford a possibility of the inward looping of a portion of the supplemental tread element under the tread portion of the tire by reason of the lateral movement of the latter by the yielding of the supplemental tread element through the running eyes.

Moreover as above indicated the running connection of the supplemental tread elements with the transverse tie members serves to facilitate the removal of the former to release the tread and tie members when replacement or repair of the latter is required.

Having described the invention, what is claimed as new and useful is:—

1. A tire chain having parallel side or marginal members provided with terminal means of engagement, transverse tread members for spanning the tire tread and having terminal connection with the said side or marginal members, and supplemental longitudinal tread elements extending continuously throughout the length of the chain in connection with said transverse tread members and at intervals from the side or marginal members such as to position said supplemental tread elements at opposite sides of, parallel with and adjacent to the active tread surface of the tire, the connection between the terminals of the transverse tread members and the side or marginal members consisting of tie members provided at their inner ends with open eyes for the reception and running engagement of said supplemental tread elements.

2. A tire chain having parallel side or marginal members provided with terminal means of engagement, transverse tread members for spanning the tire and having terminal connection with said side or marginal members, and supplemental longitudinal tread elements having running engagement with said transverse members and extending continuously throughout the length of the chain, said supplemental tread elements being disposed at opposite sides of, parallel with and adjacent to the active tread surface of the tire, one terminal of said supplemental tread elements having an eye for running engagement with the other terminal portion of the same element, the remaining terminal of said element having a fastener for engagement with a selected link in the adjacent side or marginal member.

3. A tire chain having parallel side or marginal members provided with terminal means of engagement, transeverse tread members for spanning the tire and having terminal connection with said side or marginal members, and supplemental longitudinal tread elements having running engagement with said transverse members and extending continuously throughout the length of the chain, said supplemental tread elements being disposed at opposite sides of, parallel with and adjacent to the active tread surface of the tire, one terminal of each supplemental tread element having an eye formed with an inwardly directed radial prong, the eye providing running engagement for the adjacent terminal portion of the same supplemental element and the prong being engageable in a link of said portion to maintain the desired tension of said element, the remaining terminal of the element having a fastener engageable with one of the links of the adjacent side or marginal member.

In testimony whereof he affixes his signature.

RAY PEPPER.